United States Patent [19]

Roberts et al.

[11] 3,713,326
[45] Jan. 30, 1973

[54] CAM GEAR POCKET OPENING MECHANISM

[75] Inventors: Victor I. Roberts, Randolph; Clifford H. Messervey, East Randolph, both of N.Y.

[73] Assignee: The Bordon Company, New York, N.Y.

[22] Filed: Jan. 25, 1971

[21] Appl. No.: 109,127

[52] U.S. Cl. .................................................73/41
[51] Int. Cl. .............................................G01m 3/04
[58] Field of Search..................73/41, 45.2, 45, 45.1

[56] References Cited

UNITED STATES PATENTS 2,311,115   2/1943   Krueger.....................................73/41
2,112,536   3/1938   Krueger..................................73/45.2

Primary Examiner—Louis R. Prince
Assistant Examiner—Denis E. Corr
Attorney—George P. Maskas, George A. Kap and Edward L. Mandell

[57] ABSTRACT

A can testing apparatus includes a spider rotatable through a can receiving station, can testing station and can discharge station; a plurality of test chambers mounted about the periphery of the spider; means for moving cans into and out of the test chambers; and means for actuating the moving means; the improvement residing in the actuating means which includes a cam track, a gear adapted to travel on the surface of the cam track and to pivot about its axis in response to variations in the contour of the cam track, and a shaft in mesh with the gear for transmitting motion to the moving means.

10 Claims, 7 Drawing Figures

INVENTORS
VICTOR I. ROBERTS
BY CLIFFORD H. MESSERVEY

ATTORNEY

CAM GEAR POCKET OPENING MECHANISM

This invention relates to can testing apparatus, and more specifically, to means for closing and opening test chambers or pockets which are provided around the periphery of a rotatable spider for the purpose of receiving cans and testing them whether they are leaky or leak-proof.

In the prior art can testing apparatus, opening and closing of the test chambers was accomplished through the interaction of rack gear pinions mounted on the rotatable spider and stationary rack gear segments which actuated opening and closing mechanism. As the rack gear pinions were rotated with the spider, the rack gear segments were so positioned that they engaged the pinions and were rotated thereby sufficiently to either close or open a test chamber. Since the prior art can testers operated at rates not exceeding about 600 cans per minute, the collision between the gear racks and pinions was severe aNd caused excessive vibration and noise, however, it was tolerable.

With the advent of improved can testers, such as can testers which are capable of operating at rates as high as about 1,200 cans per minute, the vibration and noise which results from the collision between gear racks and pinions is intolerable from the standpoint of safety and precise operation of the apparatus. At high speeds such as 1,200 cans per minute, the integrity of the can testers is jeopardized in that the apparatus does not hold together and the leak detector does not operate properly because it is sensitive to vibration and high frequency noise.

It is, therefore, an object of this invention to provide can testing apparatus the operation of which would contribute to the abatement of noise and vibration pollution.

It is another object of this invention to provide can testing apparatus which is simpler and lighter than the prior art can testers.

It is a further object to construct can testing apparatus which can operate precisely, dependably and efficiently at speeds of at least 1,200 cans per minute without undue noise and vibration.

Other objects and advantages resulting from the novel apparatus will become apparent from the general and detailed description thereof which is set forth below.

The can testing apparatus, which forms the subject of the present invention, features a novel closing and opening mechanism which greatly reduces noise and vibration, as well as the weight of the apparatus. In a 36-pocket can tester, which has a total of 18 brackets, the reduction in weight amounts to 270 pounds, or 15 pounds per bracket. The corresponding reduction in weight on a 48-pocket can tester is 360 pounds. The noise level measured on the can testers which utilize the novel feature described herein is substantially lower than on the prior art can testers.

Although a plurality of opening and closing mechanisms are provided on the apparatus about the rotatable spider, only one of such mechanisms will be described. The mechanism includes a bracket, a shaft journalled in the bracket having a gear section on its surface, a segmental gear mounted on the bracket and meshing with the gear section on the shaft, and a pair of cam rings disposed laterally of and being in functional contact with the gear. A pair of roller bearings provided on each side of the segmental gear roll on the surfaces of the cam rings and thus provide guidance to the segmental gear. The cam rings are designed to provide pivotal motion to the segmental gear which transmits this motion to a connecting rod. This connecting rod transforms the rotary motion of the segmental gear into linear movement which is utilized to close and open the test chambers.

The segmental gear is off-set to one side of the bracket so that the roller bearings are positioned between the cam rings. The bracket is mounted on the rotatable spider and carries with it, as the spider is rotated, the shaft provided with a gear section and the segmental gear which is positioned between the cam rings. The cam rings are stationary. As the spider is rotated, the segmental gear is moved between the stationary cam rings and closely follows the surfaces thereof. When the contour of the surface of the cam rings changes, this change is imparted to the segmental gear and takes the form of pivotal movement which is transmitted to the shaft through the gear section and then on to provide impulse to close and open the test chambers.

The various features of the apparatus of this invention will become apparent from the following detailed description set forth in connection with the accompanying drawings which relate to the preferred embodiment of the present invention and are provided by way of illustration.

Figure 2:
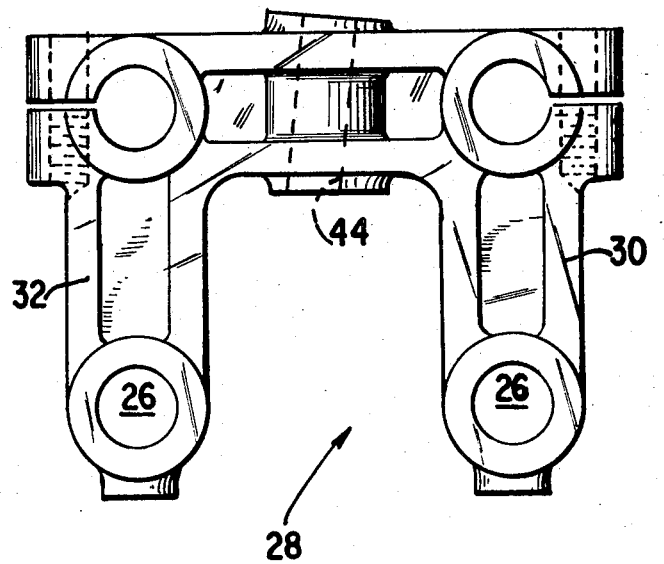
FIG. 2 illustrates the clamping pad bracket which supports a resilient pad for sealing the open end of the can when the pad is brought against the can at a point in time when the can is disposed within the test chamber.
Figure 4:
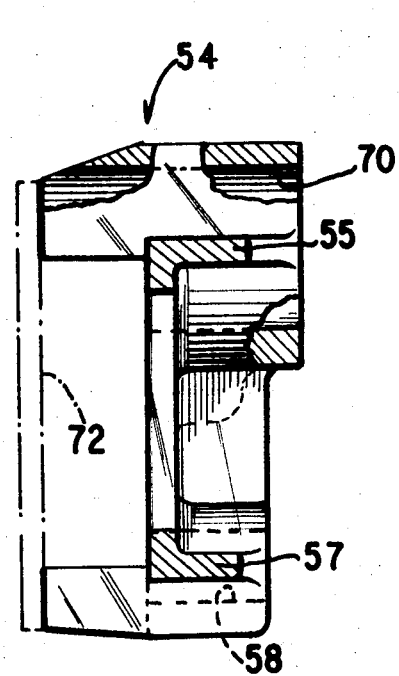
FIG. 4 is a view of the bracket along section 4—4 in FIG. 3.
Figure 3:
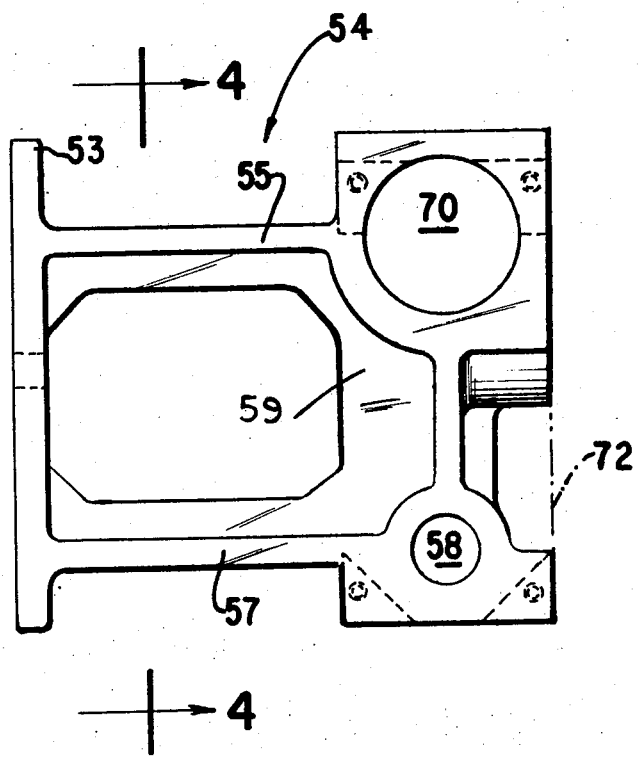
FIG. 3 is a front view of the bracket which supports a segmental gear and a meshing shaft which shaft, when rotated by the action of the segmental gear, transmits motion to associated structure for closing and opening the test chamber.
Figure 5:
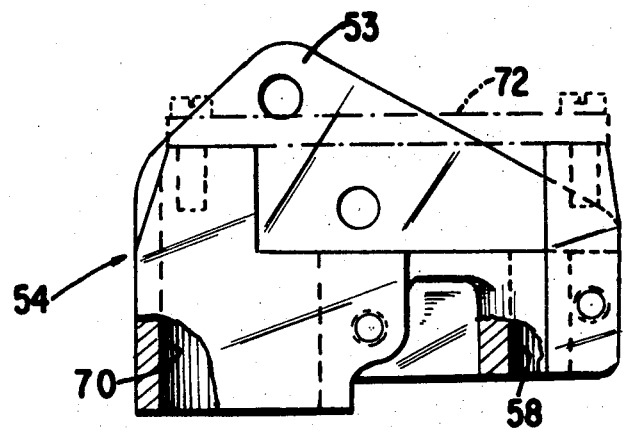
FIG. 5 is a top view of the bracket clearly showing the relationship between the bracket and the swingable gate which maintains the segmental gear in position on the bracket.

Referring now to the drawings for specific description of the apparatus, the cam testing apparatus includes a spider 10, which is rotated on shaft 12 through a plurality of stations arranged in arcuate sequence. These stations include a can receiving station, can testing station and can discharge station for both leakproof and leaky cans. Can 14 is held between resilient pad 16 and plunger 18 and is moved into test chamber 20 by synchronous movement of resilient pad 16 and plunger 18 which is yieldably mounted on rod 36 by means of spring 38. Resilient pad is mounted on disk 22 having an integral hollow stem 24 which is secured in opening 26 of clamping pad bracket 28, shown in FIG. 2. As shown in FIG. 2, bracket 28 has a pair of parallel extensions 30,32 each being provided at its extremity with an opening 26. A plurality of brackets 28 are provided on the periphery of the apparatus and each bracket supports a pair of resilient pads 16 so that, when a bracket is displaced, the pair of resilient pads is moved in unison with the bracket. Clamping pad bracket 28 is rigidly affixed in spaced relationship to bracket 34 by a section of heavy tube 40, which bracket 34, in the fashion of bracket 28, supports a pair of rods 36 which are moved in unison with bracket 34. Although not clearly shown in FIG. 1, tube 40 passes slidably through an opening in spider 10. Motive force is imparted to the closing means, which includes resilient pad 16 and plunger 18 with their associated elements, through pin 42 which engages opening 44 in clamping pad bracket 28 and connecting rod 46. The motive force, which is transmitted via connecting rod 46, is caused by the movement of segmental gear 48 between cam rings 50,52 disposed in cam gear housing 54. Cam housing 54, as fully illustrated in FIGS. 3, 4 and 5, has a flange 53 through which it is secured to spider 10 and therefore, rotates therewith during the operation of the apparatus. Flange 53 supports a pair of upstanding legs 55,57 which are joined at the top by bridge structure 59. Cam ring 50 is secured to stationary support ring 49 by means of cam support bracket 51, whereas cam ring 52 is directly affixed to the support ring 49.

Figure 6:
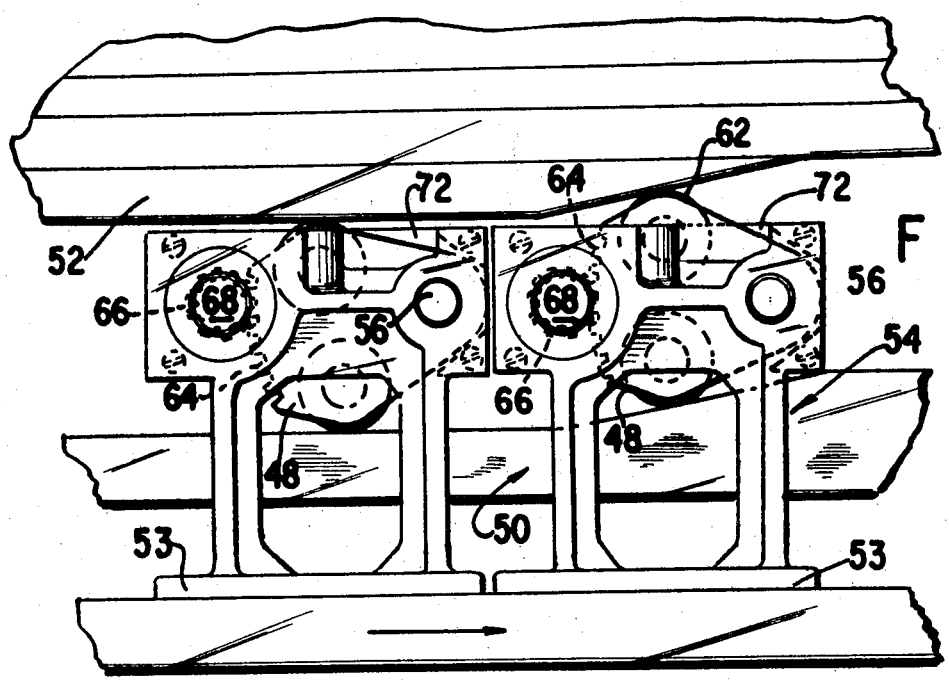
FIG. 6 shows the relative disposition of a pair of brackets, the segmental gears, shafts which transmit the impulse to the closing and opening mechanism, and the cam rings on the upper and lower sides of the segmental gears.

A plurality of cam gear housings are arranged around the periphery of stationary ring 49, as illustrated in FIG. 6, where it is clearly shown that segmental gear 48 is rotatably secured on shaft 56 in each of the cam gear housings 54 by means of gate 72. Shaft 56 is disposed in opening 58 of the cam gear housing. Gear 48, which is segmental in shape, includes a pair of outwardly protruding roller bearings 60,62 which are in simultaneous contact with cam rings 50, 52. An arcuate section of teeth 64 is provided on segmental gear 48 which mesh with a section of teeth 66 on shaft 68 disposed within bore 70 of cam gear housing 54.

Figure 7:
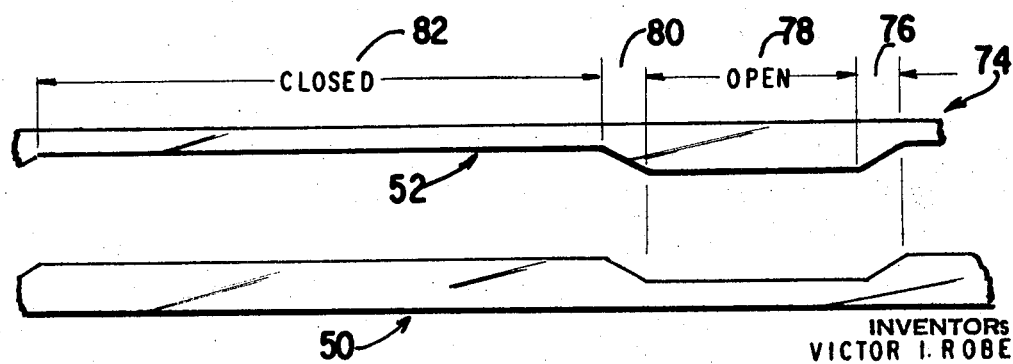
FIG. 7 shows a flat lay-out of a pair of cam rings and the contour of the cam surfaces.

FIG. 7 illustrates a flat parallel lay-out of cam rings 50,52 which includes about 90° of an open section and about 270° of a closed section. By open section, we mean that the disposition of the cam ring surfaces is such that the position of plunger 18 is at the mouth of test chamber 20 and the resilient pad 16 is displaced from the plunger a distance equivalent to about the height of a can. The open section corresponds to the open position illustrated in FIG. 1, in which position, the apparatus can either receive or discharge cans. In FIG. 7, point 74 designates the end of the closed position wherefrom segmental gear 48 descends through intermediate section 76 into the open section 78 where it swells for about 90° as it travels on into the closed section 82 through the intermediate section 80.

Figure 1:
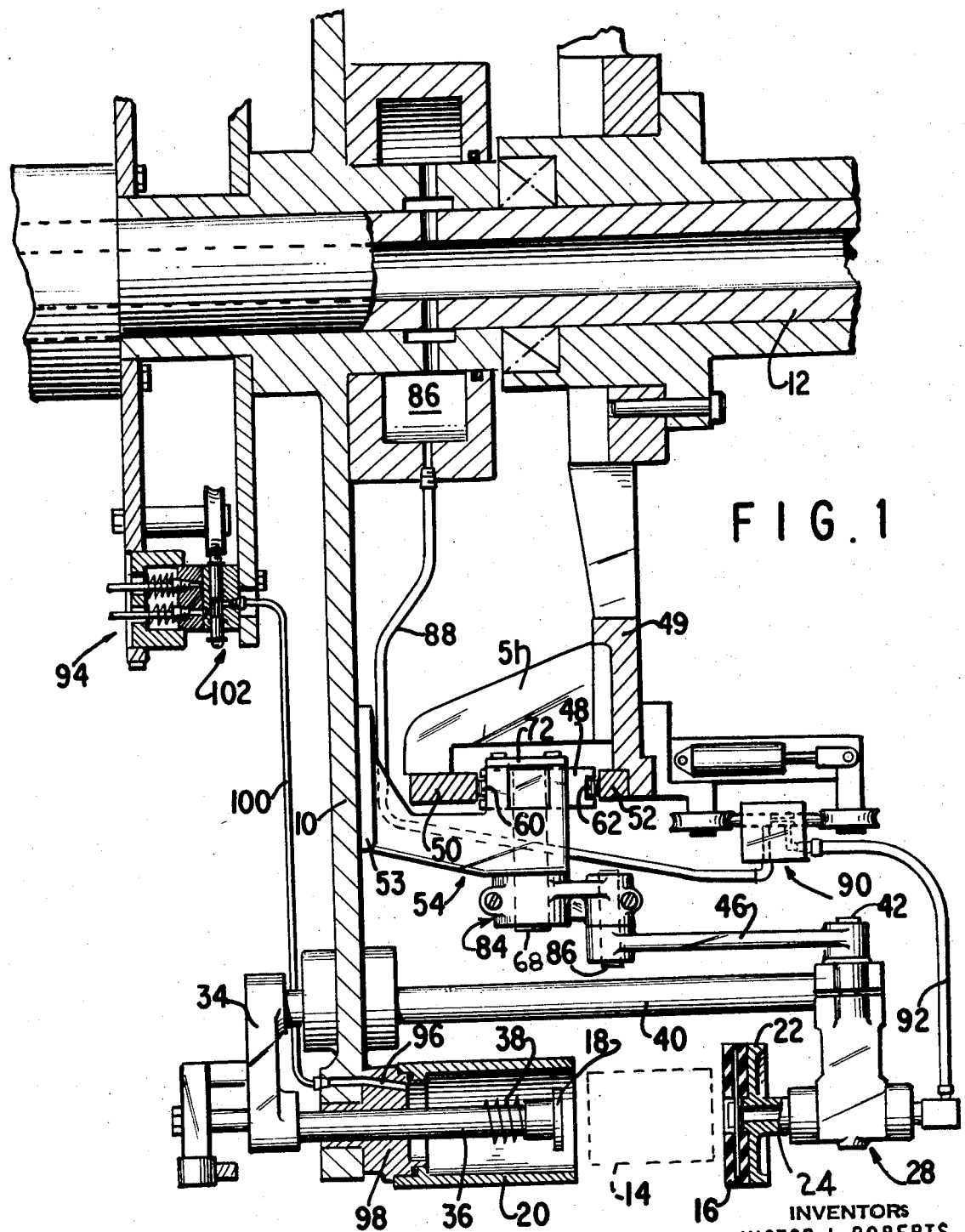
FIG. 1 is a partial sectional view of the can testing apparatus illustrating the relationship between the cam rings and the mechanism for closing and opening the test chamber.

Shaft 68 extends beyond cam gear housing 54, as illustrated in dotted lines in FIG. 1, and engages crank 84, which in turn, is rotatably secured to connecting rod 46 through pin 86.

At a certain point in time when can 14 is disposed within test chamber 20, air is introduced into the can from air reservoir 86 through tubing 88, valve 90, tubing 92 and the hollow stem 24. Any air leaking from can 14 will find its way into test chamber 20 from where it will be conducted to the leak detector 94 via opening 96 in support block 98, tubing 100 and test valve 102. Detailed description of valves 90,102 and the leak detector 94 has been purposely omitted since it does not form a part of the herein-described invention. However, if a complete understanding is desired of the structure and operation of valves 90,102 and the leak detector 94, reference is hereby made to U.S. copending patent application entitled "High Pressure Cab Testing Apparatus" which fully describes these components and their relationships to the can testing apparatus. This application was filed on Dec. 23, 1970 and bears Ser. No. of 100,892.

In an alternate embodiment, same results can be achieved in the operation of the can testing apparatus by removing one of the cam rings and biasing segmental gear 48 against the remaining cam ring. Adaptation to this embodiment would preferably involve the use of a modified gear which is provided with only one roller bearing biased to ride on the cam ring.

Operation of the apparatus is commenced by rotating spider 10 on shaft 12. As is apparent from FIG. 1, test chamber 20, clamping pad bracket 28, bracket 34 and the associated elements rotate with spider 10 while cam rings 50,52 remain stationary. The open position of the closing and opening mechanism illustrated in FIG. 1 indicates that segmental gear 48 is disposed between cam rings 50,52 anywhere in the section designated "open" in FIG. 7. While in the open position, tested cans are discharged from the can tester while others, to be tested, are fed thereinto between resilient pad 16 and plunger 18.

As the spider rotates, segmental gear 48 enters the section designated "closed" in FIG. 7 through an intermediate section 80. In response to the movement of the segmental gear 48 into the closed section, shaft 68 is rotated by virtue of being in mesh with segmental gear 48 through gear section 66. Rotation of shaft 68 is transmitted to clamping pad bracket 28 via crank 84, pin 86, connecting rod 46 and pin 42. Since clamping pad bracket 28 is rigidly connected in spaced relationship to bracket 34, which bracket 24 supports rod 36, can 14 fed to the can tester is moved into test chamber 20 by co-operative action of resilient pad 16 and plunger 18. In this position, the mouth of can 14 and mouth of test chamber are sealed by pad 16 from the atmosphere and from each other.

After the can has been positioned within the test chamber, valve 90 is manipulated to permit passage of pressurized air from reservoir 86 into can 14 through tubing 88, valve 90, tubing 92 and hollow stem 24. The test chamber is kept sealed while a test is conducted on the can. If the can leaks, air from the can will enter the test chamber detector 94 via opening 96 and tubing 100. In this position, valve 102 is actuated so as to permit passage of air from the test chamber to leak detector 94. Air entering the leak detector will actuate a discharge mechanism in order to separate leaky from leak-proof cans. If the can in the test chamber is leak-proof, the discharge mechanism will not be actuated and the leak-proof can will be ejected from the can testing apparatus together with other leak-proof cans.

The cycle is completed when the segmental gear 48 returns to the open section, at which time, the tested cans are discharged and the cans to be tested are received in the can tester.

What is claimed is:

1. In an apparatus for testing air leakage of cans including a rotatable spider which moves through a can receiving station, can testing station and can discharge station; a plurality of test chambers mounted on said rotatable spider, said chambers being open at one end and adapted to receive cans; means for moving cans into and out of said test chambers; means for actuating said moving means; means in association with said moving means for simultaneously sealing the cans and said test chambers from the atmosphere and from each other; means for injecting pressurized gas into the cans while they are disposed in said test chambers and sealed from the atmosphere and the test chambers; a leak detector; conduit means interposed between said test chambers and said leak detector for conveying any gas leaking from the cans from within the test chambers to said leak detector; the improvement residing in said actuating means which includes a cam track having an open section and a closed section; and a gear associated with said rotatable spider in contact with said cam track and adapted to move thereon, said gear producing an actuating force for moving the cans into and out of said test chambers in response to the relative movement between said rotatable spider and said cam track.

2. Apparatus of claim 1 wherein said cam track includes two spaced, parallel surfaces with said gear disposed between.

3. Apparatus of claim wherein said cam track includes a pair of spaced cam rings disposed in cooperative relationship with said gear disposed between.

4. Apparatus of claim 3 wherein said gear includes roller bearings on its sides which come in contact with said cam rings.

5. Apparatus of claim 4 wherein said cam track includes intermediate sections between said open and closed sections, which intermediate sections have curved surfaces
 to provide uniform transition from open section to closed section and vice versa.

6. Apparatus of claim 5 wherein said gear is a segmental gear.

7. Apparatus of claim 6 including a bracket mounted on said rotatable spider and having a rotatable shaft mounted thereon, teeth provided on said rotatable shaft, said gear being mounted on said bracket in meshing relationship with said teeth on said rotatable shaft.

8. Apparatus of claim 7 which includes a plurality of said moving means and a plurality of said actuating means, each of said moving and actuating means is associated with a pair of test chambers and co-operate to move in unison a pair of cans into and out of a corresponding pair of said test chambers.

9. Apparatus of claim 6 which includes a plurality of said gears, a separate shaft in association with each of said gears, each of said shafts is provided with a gear section which meshes with one of said gears and utilizes actuating force of said gear for moving the cans into and out of said test chambers.

10. Apparatus of claim 8 wherein extent of said open section of said cam track is about 90° and that of said said closed section is about 270°, said apparatus including a plurality of said brackets each provided with said rotatable shaft and said gear.

* * * * *

UNITED STATES PATENT OFFICE
CERTIFICATE OF CORRECTION

Patent No. 3,713,326     Dated Jan. 30, 1973

Inventor(s) Victor Issac Roberts and Clifford H. Messervey

It is certified that error appears in the above-identified patent and that said Letters Patent are hereby corrected as shown below:

Item [73], please change "Bordon" to - Borden - ;

Col. 1, line 21, please change "aNd" to - and - ;

Col. 3, line 63, please change "swells" to - dwells - ;

Col. 4, line 16, please change "Cab" to - can - ;

Col. 5, line 30, please change "saId" to - said - ;

Col. 5, line 36, after the word "claim" insert - 1 - ;

Signed and sealed this 10th day of July 1973.

(SEAL)
Attest:

EDWARD M. FLETCHER, JR.
Attesting Officer

Rene Tegtmeyer
Acting Commissioner of Patents